April 25, 1933.  E. P. TUFTS  1,905,768
SAWMILL DOG
Filed Aug. 24, 1932  2 Sheets-Sheet 1
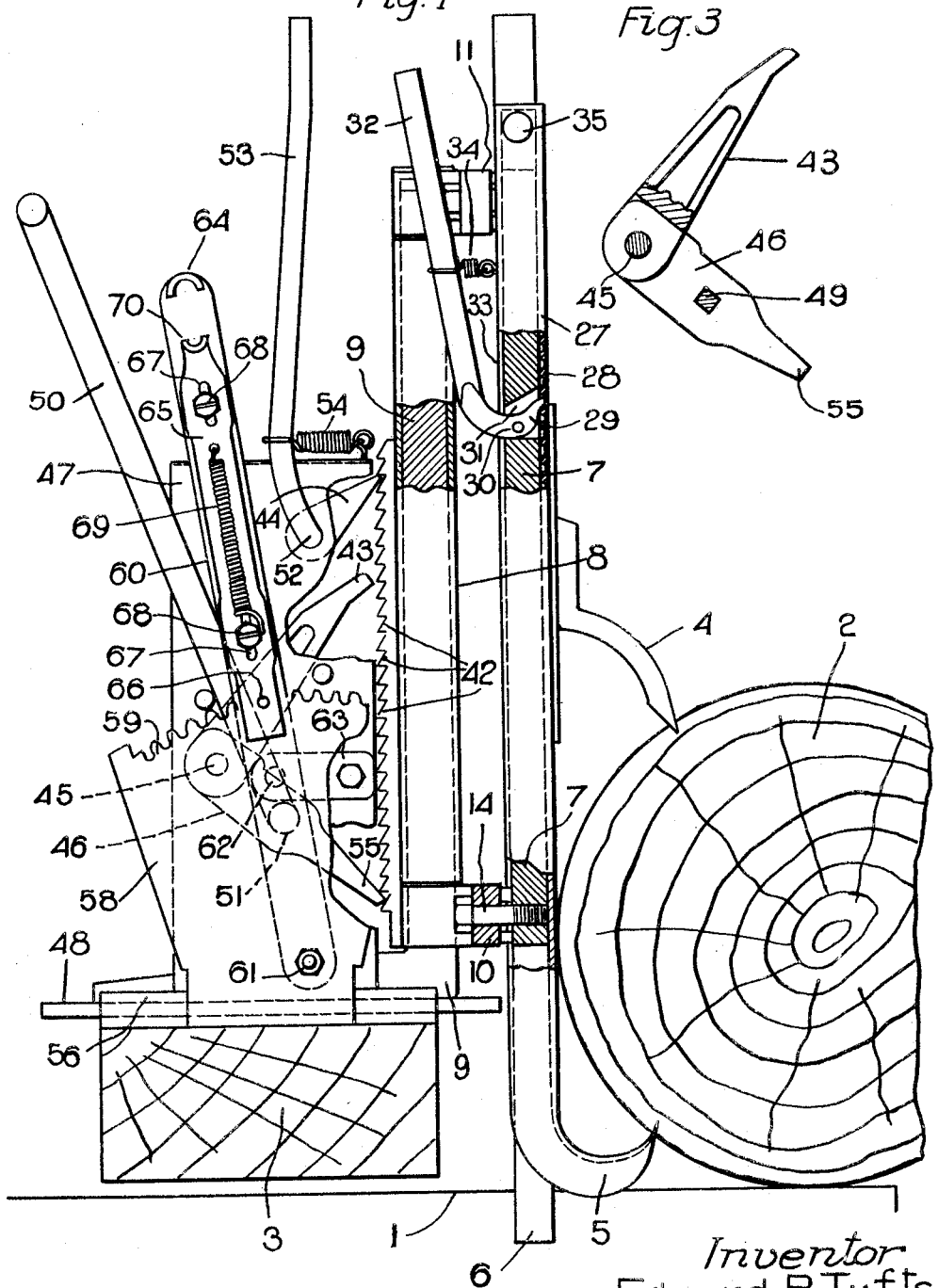
Inventor
Edward P. Tufts.
per Heard Smith & Tennant
Attorneys

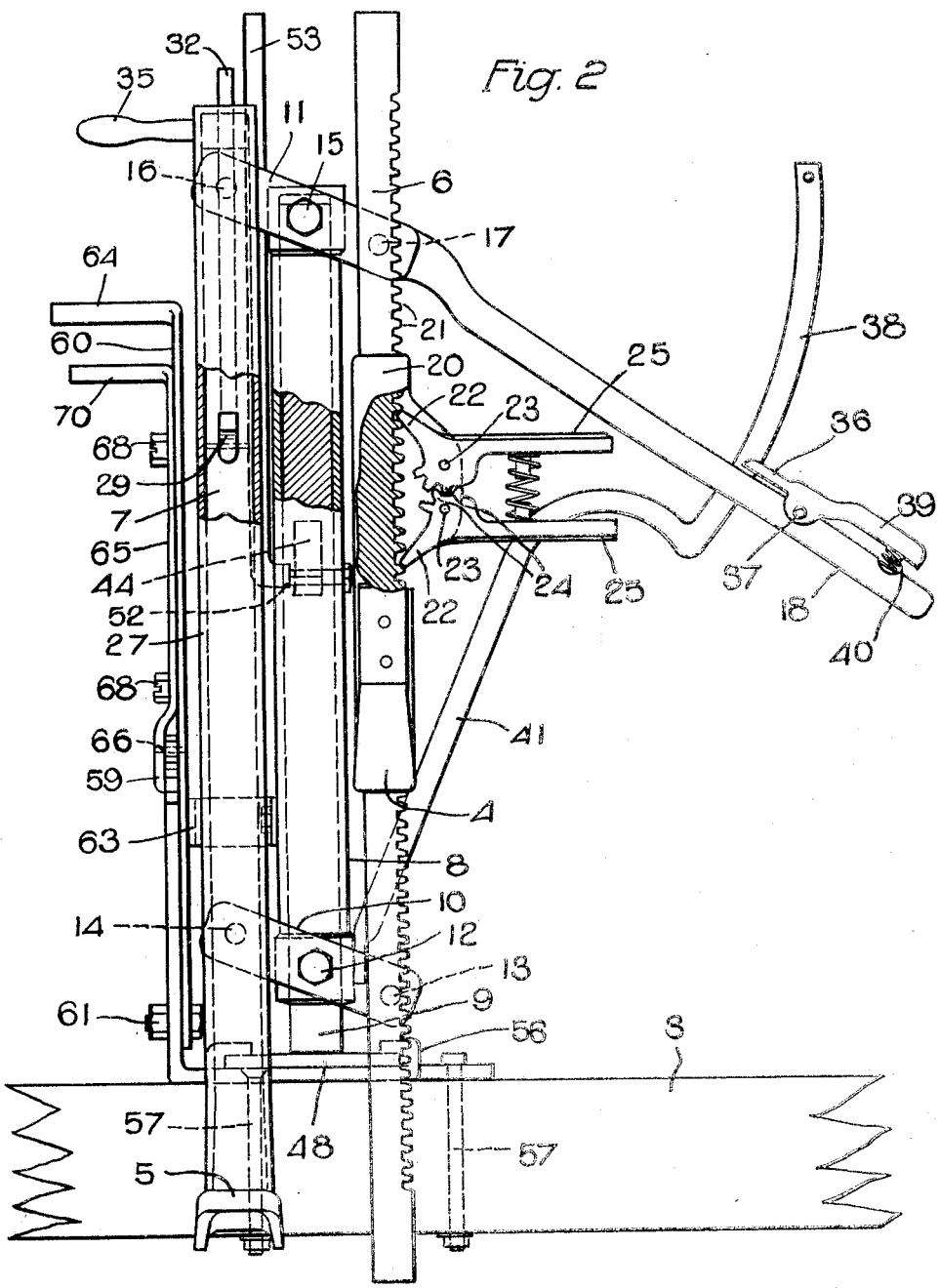

Patented Apr. 25, 1933

1,905,768

UNITED STATES PATENT OFFICE

EDWARD P. TUFTS, OF BOW, NEW HAMPSHIRE

SAWMILL DOG

Application filed August 24, 1932. Serial No. 630,201.

This invention relates to sawmill dogs and it has for one of its objects to provide a novel dog structure which is simple in operation and which facilitates the dogging of a log and the release of the dogs therefrom and which is also constructed so that the entire dog structure with the log dogged thereby can be easily raised relative to the saw arbor to permit knots or bends in the log to pass over the arbor.

The quick dogging of the log and release of the dogs is secured by a construction which includes an operating lever together with means whereby a single movement of the lever in one direction will operate to cause both dogs to simultaneously bite into the log. When the dogs are properly adjusted, therefore, the dogging of the log is accomplished by a single swift movement of the operating lever.

The raising of the entire dog structure with the log dogged thereby is secured through the medium of a jack that can be readily actuated from an operating lever and which serves to lift the entire dog structure and log relative to the saw carriage. The jack is also constructed so that it will retain the dog structure and log in any adjusted elevated position.

In order to give an understanding of the invention I have illustrated in the drawings a selected embodiment thereof which will now be described after which the novel features will be pointed out in the appended claims.

Fig. 1 is a view of a dog embodying my invention when looked at in the direction of the length of the log;

Fig. 2 is a view of the device shown in Fig. 1 when viewed from the right, parts being broken out to better show the construction;

Fig. 3 is a detail of the jack for raising the dog structure.

In the drawings 1 indicates part of a sawmill carriage on which the log 2 to be sawed is supported and 3 is one of the longitudinal members of said carriage on which the dog structure is mounted.

The dog structure comprises an upper dog 4 and a lower dog 5 as usual in sawmill dogs. The upper dog 4 is shown as carried on a vertical dog-carrying bar 6 while the lower dog 5 is mounted on another vertical dog-carrying bar 7. These two dog-carrying bars are shown as supported on a sleeve 8 which fits over and is slidable on a post or standard 9 that is mounted on the portion 3 of the carriage.

The connection between the dog-carrying bars 6 and 7 and the sleeve 8 comprises two lever members 10 and 11 which are pivotally mounted on the sleeve 8 at the bottom and top thereof respectively and which are also pivotally connected to the dog-carrying bars 6 and 7.

The lever 10 is pivoted on the sleeve at 12 and is pivotally connected to the dog-carrying bars 6 and 7 at 13 and 14 respectively. The lever member 11 is pivotally connected to the upper end of the sleeve at 15 and is pivotally connected to the bar 7 at 16 and to the bar 6 at 17. The lever member 11 is extended to form an operating handle 18. With this construction it will be seen that as the handle 18 is moved up or down the two dog-carrying bars 6 and 7 will be moved simultaneously in opposite directions. The downward movement of the lever 18 will cause a downward movement of the dog-carrying bar 6 carrying the upper dog 4 and an upward movement of the dog-carrying bar 7 carrying the lower dog 5 so that by a downward sweep of the lever arm 18 both dogs may be simultaneously dogged into the log 2.

Each dog is adjustable vertically on its dog-carrying bar so that the dogs can be readily adjusted for logs of different sizes. The upper dog 4 is rigidly secured to a sleeve 20 which encircles the bar 6 and is slidable vertically thereon.

The bar 6 is provided with teeth 21 with which locking dogs 22 are adapted to engage for locking the sleeve 20 in any adjusted position on the bar 6. These locking dogs are pivoted on separate pivots 23 and are provided with intermeshing teeth 24 so that they will turn about their pivots 23 in unison. Each dog is provided with a handle 25 and the two handles are acted on by a spring 26 which is situated between them, said spring tending normally to separate the handles and thereby throw the dogs 22 into locking engagement with the teeth 21 as shown in Fig. 2. By pressing the handles 25 together the dogs 22 will be withdrawn from the teeth 21 and the sleeve 20 can then be adjusted vertically on the bar 6 into any desired position.

The lower dog 5 is also carried at the lower end of a long sleeve 27 which encircles and slides on the dog-carrying bar 7. One of the inner faces of the sleeve 27 is formed with a plurality of teeth or locking projections 28 adapted to engage a locking dog 29 which is pivotally mounted at 30 in a slot 31 formed in the bar 7. This locking dog 29 is provided with an operating handle 32 which extends through a slot 33 with which the back side of the sleeve 27 is provided. A spring 34 normally holds the locking dog 29 in operative position to lock the sleeve 27 to the bar 7. When the handle 32 is swung to the left Fig. 1 the dog 29 will be withdrawn from the teeth 28 thereby freeing the sleeve 27 so that it may be raised or lowered on the bar 7 by means of a handle 35 which extends laterally from said sleeve near its upper end.

The slot 33 extends the full length of the sleeve and the pivotal connections 14 and 16 extend through said slot. Hence by releasing the dogs 29 and 22 the sleeves 27 and 20 carrying the log-gripping dogs 5 and 4 can be raised or lowered to place them in correct position for dogging a log of any size or shape. When the locking dogs 22 and 29 are released they lock the log-gripping dogs 4 and 5 to the vertical bars 6 and 7 so that when the lever 18 is given its operative downward movement the two dogs 4 and 5 will be caused simultaneously to dog into the log 2.

The handle 18 is shown as having a friction-gripping device 36 pivotally mounted thereto at 37 and adapted to engage a quadrant 38 for locking the lever 18 in its lowered position. This friction-gripping device 36 is formed with a handle 39 by which it may be released and a spring 40 situated between the grip handle 39 and the lever handle 18 serves normally to hold the friction grip in its operative position.

The quadrant 38 is shown as carried by an arm 41 which is rigidly secured to the sleeve 8.

I have stated above that my improved dog structure includes a jack device by which the dog structure with the log dogged thereby may be bodily raised. This is done by raising the sleeve 8 on the post 9 and since the dog-carrying bars 6 and 7 are mounted on the sleeve 8 the lifting of the sleeve will lift the dogs as a unit. The sleeve 8 is formed on one side with a plurality of ratchet teeth 42 which co-operate with a lifting dog 43 and the retaining dog 44 of the jack structure.

The lifting dog 43 is pivotally carried at 45 on the end of a rocking member 46. These dogs and the rocking member 46 are mounted on an upstanding support 47 which rises from a foot member or plate 48 to which the post 9 is secured. The rocking member 46 is rigid with the laterally bent portion 49 of a lever 50 which is pivoted to the upright 47 at 51. When the lever 50 is swung to the right Fig. 1 the rocking member 46 will be turned clockwise which will cause the lifting pawl 43 to engage one of the teeth 42 and to lift the sleeve 8 on the post 9.

The retaining pawl 44 clicks over the teeth 42 as the sleeve is lifted and serves to hold the sleeve in its raised position. At each swinging movement of the lever 50 toward the right the sleeve 8 will be raised a certain amount and when the lever is moved back to the left again to the position shown in Fig. 1 the lifting pawl 43 will click over the ratchet teeth, it being understood that the sleeve is at this time held in raised position by the retaining dog 44. The dog 44 is pivoted to the upright 47 at 52 and is provided with a handle 53 by which it can be disengaged from the ratchet teeth 42. A spring 54 acts on the handle 53 and holds the retaining dog 44 yieldingly in engagement with the ratchet teeth.

The rocking member 46 is provided with an extension 55 which co-operates with the teeth 42 to lock the sleeve against upward movement. When the lifting dog 43 and rocking member 46 are in their normal position shown in Fig. 1 said extension 55 engages the inclined face of one of the teeth 42 and serves to lock the sleeve from moving upwardly. The swinging movement of the member 46 by which the lifting dog 43 is brought into engagement with the ratchet teeth 42 will carry the end 55 away from and out of engagement with the teeth 42.

If the log 2 is provided with a knot or crook on its under side which would normally strike the saw arbor as the carriage is moved forward, the operator will manipulate the lever 50 thereby raising the sleeve 8 as above described and this will raise the dog structure with the log dogged thereby as a unit so as to enable the knot or projection on the log to clear the saw arbor.

The device is also provided with means by which the dog structure with the log dogged thereby can be moved laterally so as to give proper position to a tapered log. For this purpose the supporting plate 48 is slidably mounted in a holder 56 which is rigidly clamped to the portion 3 of the carriage by means of clamping bolts 57. This support 56 has a plate 58 rigid therewith and rising therefrom, the upper edge of which is provided with teeth or projections 59. 60 is a lever pivoted at 61 to the stationary upstanding plate 58 and also pivoted at 62 to an arm or projection 63 that is secured to the plate 47. The lever 60 has a handle 64 on its upper end by which it can be swung toward the right, Fig. 1. Since this lever 60 is pivoted at 61 to a stationary part 58 the swinging movement to the right will operate through the arm 63 to move the standard 47 and the foot 48 to the right. Since the dog structure is mounted on this foot such movement will move the dogs 4, 5 and the log bodily and as a unit toward the right.

For locking the lever 60 in adjusted position the latter is provided with a locking slide 65 which is slidable on the lever in the direction of its length and provided with a locking pin 66 adapted to engage in the recess between the teeth 59. This slide 65 is shown as slotted at 67 and is guided in its movement by screws 68 which extend through the slots and screw into the lever 60. A spring 69 acting on the slide tends normally to hold it in its operative position and the upper end of the slide is formed with a handle 70 by which it can be lifted to release the pin 66 from locking engagement with the quadrant 59.

I claim:

1. A sawmill dog comprising a supporting post, a sleeve fitting over said post and adjustable vertically thereon, two dog-carrying bars carried by said sleeve, an upper dog mounted on one bar, a lower dog mounted on the other bar, means for moving said bars simultaneously but in opposite directions to cause the dogs to bite into the log, said sleeve having ratchet teeth, a rocking pawl-supporting member, a lifting pawl carried by said member and adapted to engage said ratchet teeth, and means to rock said member thereby to cause the lifting pawl to engage the ratchet teeth and raise the sleeve and dogs supported thereby relative to the post, said rocking member having means normally engaging said teeth to lock the sleeve from raising movement.

2. A sawmill dog comprising a supporting post, a sleeve fitting said post and adjustable vertically thereon, two levers pivotally mounted on the sleeve, one at the top thereof and one at the bottom, two dog-carrying bars situated on opposite sides of the sleeve and each pivotally connected to both levers, an upper dog mounted on one bar, a lower dog mounted on the other bar, one lever having a handle extension by which the levers may be operated to give simultaneous but opposite movement to said bars thereby to cause the dogs to bite into the log, and a jack device for raising the sleeve on the post thereby to raise the dogs and the log dogged thereby as a unit.

3. A sawmill dog comprising a supporting post, a sleeve fitting said post and adjustable vertically thereon, two levers pivotally mounted on the sleeve, one at the top thereof and one at the bottom, two dog-carrying bars situated on opposite sides of the sleeve and each pivotally connected to both levers, an upper dog mounted on one bar, a lower dog mounted on the other bar, one lever having a handle extension by which the levers may be operated to give simultaneous but opposite movement to said bars thereby to cause the dogs to bite into the log, said sleeve having ratchet teeth, and means co-operating with said ratchet teeth to raise the sleeve on the post with a step by step movement.

4. A sawmill dog comprising a supporting post, a sleeve fitting said post and adjustable vertically thereon, two levers pivotally mounted on the sleeve, one at the top thereof and one at the bottom, two dog-carrying bars situated on opposite sides of the sleeve and each pivotally connected to both levers, an upper dog mounted on one bar, a lower dog mounted on the other bar, one lever having a handle extension by which the levers may be operated to give simultaneous but opposite movement to said bars thereby to cause the dogs to bite into the log, said sleeve having ratchet teeth, a sleeve-lifting pawl, means to actuate the pawl to cause it to engage the ratchet teeth and raise the sleeve on the post, and a retaining pawl co-operating with said ratchet teeth to hold the sleeve raised.

5. A sawmill dog comprising a supporting post, a sleeve fitting said post and adjustable vertically thereon, two levers pivotally mounted on the sleeve, one at the top thereof and one at the bottom, two dog-carrying bars situated on opposite sides of the sleeve and each pivotally connected to both levers, an upper dog mounted on one bar, a lower dog mounted on the other bar, one lever having a handle extension by which the levers may be operated to give simultaneous but opposite movement to said bars thereby to cause the dogs to bite into the log, said sleeve having ratchet teeth, a rocking pawl-supporting member, a lifting pawl carried by said member and adapted to engage said ratchet teeth, and means to rock said member thereby to cause the lifting pawl to engage the ratchet teeth and raise the sleeve and the dogs supported thereby relative to the post.

In testimony whereof, I have signed my name to this specification.

EDWARD P. TUFTS.